No. 781,233. PATENTED JAN. 31, 1905.
J. SCHMUCK.
PRISM SUPPORT FOR USE WITH OPTICAL INSTRUMENTS.
APPLICATION FILED APR. 28, 1904.
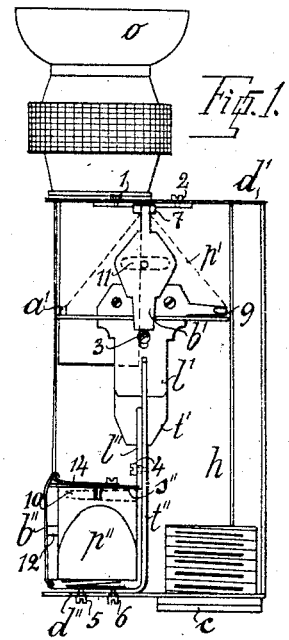
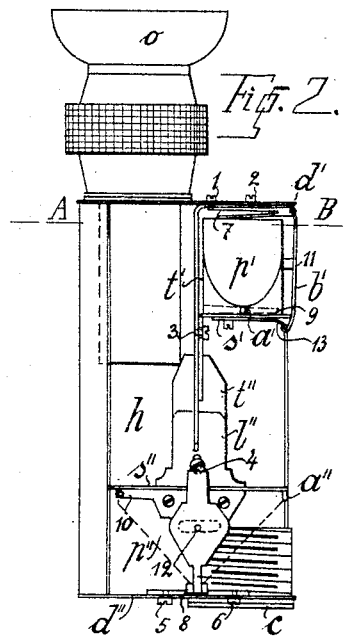
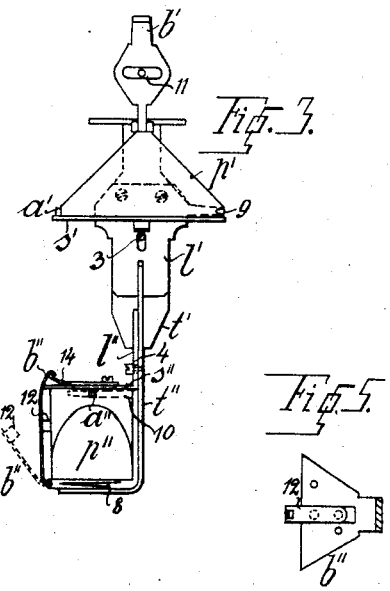
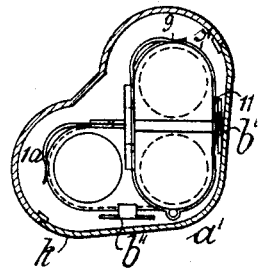
Witnesses:
E. H. Hardy
Walter Allen
Inventor.
Joseph Schmuck.
by Herbert W. Jenner.
Attorney.

No. 781,233.

Patented January 31, 1905.

UNITED STATES PATENT OFFICE.

JOSEPH SCHMUCK, OF STEGLITZ, NEAR BERLIN, GERMANY.

PRISM-SUPPORT FOR USE WITH OPTICAL INSTRUMENTS.

SPECIFICATION forming part of Letters Patent No. 781,233, dated January 31, 1905.

Application filed April 28, 1904. Serial No. 205,373.

*To all whom it may concern:*

Be it known that I, JOSEPH SCHMUCK, a subject of the King of Prussia, residing at Steglitz, near Berlin, Germany, have invented certain new and useful Improvements in Prism-Supports for Use with Optical Instruments; and I do hereby declare the following to be a full, clear, and exact description of the invention, such as will enable others skilled in the art to which it appertains to make and use the same.

This invention relates to a new or improved prism-support for use with optical instruments.

In optical instruments containing a prism or prisms, more particularly in prismatic telescopes, binoculars, and the like, the adjustment of the prisms is attended with considerable difficulty. This difficulty has been specially felt in connection with prism-telescopes. In most prism-telescopes the prisms are arranged on supports or "chairs," which can only be constructed with accuracy in instruments of precision. The prism support or chair is generally integral with the case of the apparatus or with a support which forms the frame of the tube. This arrangement has the disadvantage that the slightest error in construction, which can easily occur even in the manufacture of instruments of precision, renders the prism-chair or its support useless. The adjustment of the instrument when there is a minute difference in the sizes of the prisms is also attended with very great difficulty if the prism-chair is in one piece. If during the adjustment dust or the like falls on the prism or the lenses, as is almost unavoidable, this dust is not perceived until the telescope is used, and the instrument must be partly or entirely taken to pieces for the purpose of cleaning it. This is a great drawback in the practical use of prism-telescopes, since however "tight" the tube is made small quantities of dust or the like are always liable to enter the instrument. Changes of temperature, more particularly in the tropics, produce films on the polished surfaces of the prisms and lenses, which render the instrument more or less useless, since it is impossible for a person who is not an expert to safely undertake the cleaning of the interior of the instrument, owing to the danger of spoiling the adjustment thereof by inexpert handling.

The object of the present invention is to remove these disadvantages by providing a prism-chair which is not only easily and accurately adjustable in its parts, but is also adjustable with regard to the case and the path of the rays.

In the annexed drawings the improved prism-chair is shown in connection with a prism-telescope; but it is adapted for use in connection with all instruments in which it is necessary to accurately adjust prisms with regard to each other and to the optical path of the rays.

In the drawings, Figure 1 is an elevation showing the device in an extended telescope, and Fig. 2 is a view of the same apparatus rotated through ninety degrees. Fig. 3 is a view of the prism-chair alone; Fig. 4, a section on the line A B of Fig. 2, and Fig. 5 represents a detail of the prism-chair.

The prism-chair is arranged inside the suitably-shaped "telescope-tube" $h$ of the instrument and comprises two rectangularly-bent supports $t'$ and $t''$, provided with narrow longitudinal slots, by means of which they engage each other in such a manner that one forms, as it were, a vertical central rib of the other and that the length of the device can be adjusted at will. The rectangularly-bent lugs of the plates are screwed to the covers of the tube or to other parts of the apparatus. To allow of slightly displacing the chair within the tube, the screw-holes in the covers $d'$ and $d''$ of the case $h$ are larger than the bodies of the screws 1, 2, 5, and 6. To the supporting-plates $t'$ and $t''$ are screwed brackets $l'$ and $l''$, respectively, the rectangularly-projecting parts $s'$ and $s''$ of which form the prism-holders proper. The screw-holes of the said brackets also allow of slight displacement of the latter for purposes of adjustment.

On the holders $s'$ and $s''$ are placed the prisms $p'$ and $p''$. In order to hold the latter securely and immovably in position, but at the same time to allow of removing the prisms and replacing them in exactly the same positions, each of the holders $s'$ and $s''$ is provided with a fixed lateral abutment $a'$ or $a''$, against which the prism is pressed by a diametrically opposite spring 9 or 10 of suitable shape. Springs 7 and 8 press the prisms against the holders $s'$ and $s''$, and from the front the prisms are pressed by springs 11 and 12, respectively, against rearward abutments. Each prism is thus held in position by three springs arranged in planes which are perpendicular to each other and by three diametrically opposite abutments.

To allow of easily inserting and removing the prisms, the springs 11 and 12 are connected to pivoted plates $b'$ and $b''$, respectively, adapted to be held in position by spring-catches 13 and 14 or by means of screws. In Fig. 3 the open position of the plate $b''$ is indicated by dotted lines, and Fig. 5 is a detail view of the said plate and the spring 12. It is obvious that while the plates $b'$ and $b''$ are in the open positions the prisms can be easily inserted and removed. When the different parts of the prism-chair itself have been properly adjusted with regard to each other, the chair itself is adjusted in the telescope in the following manner: The eye-lens holder $o$ and the objective-lens $c$ are unscrewed and the prism-chair is inserted into the telescope in the approximately accurate position. Thereupon screw-threaded adjusting tubes or rods are screwed into the objective and eye lens apertures, said tubes having exactly the same diameter as the apertures of the respective prism-holders. The adjustment of the prism-chair is then effected by making the apertures of the prism-holders coincide with or engage over the respective adjusting tubes or rods and then screwing or otherwise fixing the prism-chair in position.

Having now particularly described and ascertained the nature of my said invention and in what manner the same is to be performed, I declare that what I claim is—

1. A prism-holder comprising a support provided with three abutments, and three springs which press the prism against the said abutments.

2. A prism-holder comprising a support provided with three abutments, a plate pivoted to the said support and provided with a retaining-catch, and three springs which press the prism against the said abutments, one of the said springs being carried by the said pivoted plate.

3. The combination, with two prism-holders each provided with fastening devices for a prism, of means for adjusting the relative positions of the said prism-holders.

4. The combination, with two prism-holders each provided with fastening devices for a prism, of slotted plates arranged crosswise of each other and secured to the said holders and slidable with respect to each other.

5. The combination, with an inclosing tube, of two prism-holders each provided with fastening devices for a prism, one of the said holders being slidable laterally of the other in the said tube, and means for securing the said holders to the said tube after their relative positions have been adjusted.

6. The combination, with an inclosing tube, of two prism-holders each provided with fastening devices for a prism, said holders being relatively slidable in the said tube both longitudinally and laterally, and means for securing the said holders to the said tube after their relative positions have been adjusted.

In testimony whereof I affix my signature in presence of two witnesses.

JOSEPH SCHMUCK.

Witnesses:
 WOLDEMAR HAUPT,
 HENRY HASPER.